J. E. JACKSON.
HARROW ATTACHMENT FOR PLANTERS.
APPLICATION FILED AUG. 24, 1908.
920,470.
Patented May 4, 1909.
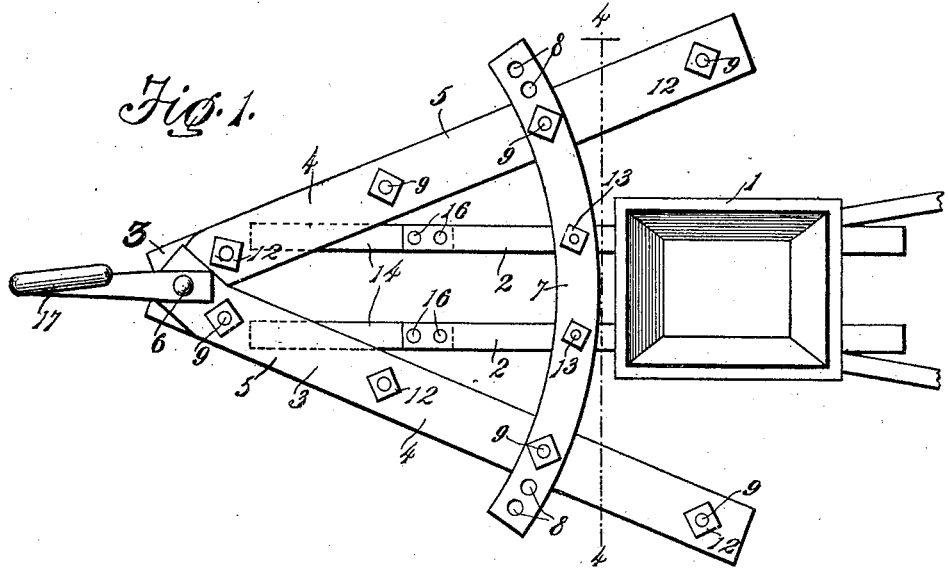
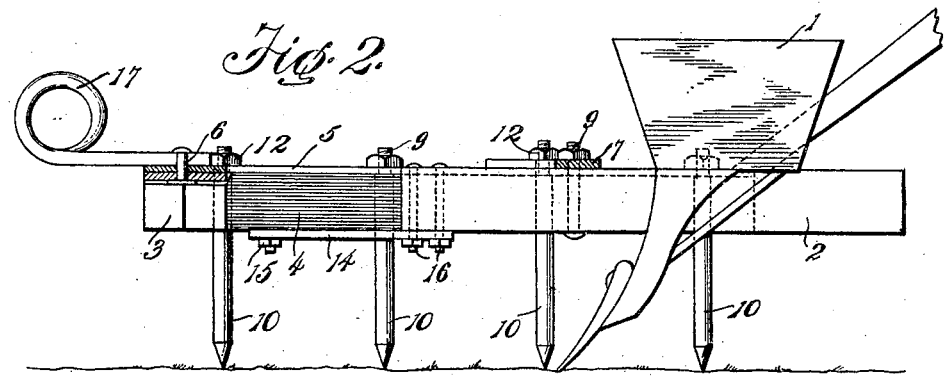
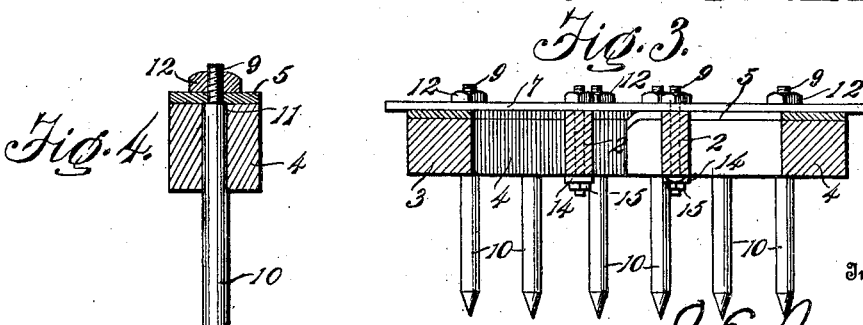
Witnesses
R. S. Johnson
L. O. Little
Inventor
J. E. Jackson
By Watson E. Coleman
Attorney

UNITED STATES PATENT OFFICE.

JOSEPH E. JACKSON, OF GALLAWAY, TENNESSEE, ASSIGNOR OF THREE-FOURTHS TO JAMES E. GRIFFIN, ORREN A. SHIELD, AND JOHN CUNNINGHAM, ALL OF GALLAWAY, TENNESSEE.

HARROW ATTACHMENT FOR PLANTERS.

No. 920,470.     Specification of Letters Patent.     Patented May 4, 1909.

Application filed August 24, 1908. Serial No. 449,933.

*To all whom it may concern:*

Be it known that I, JOSEPH E. JACKSON, a citizen of the United States, residing at Gallaway, in the county of Fayette and State of Tennessee, have invented certain new and useful Improvements in Harrow Attachments for Planters, of which the following is a specification, reference being had to the accompanying drawings.

This invention relates to a harrow attachment for ready application to and removal from corn planters, cotton planters and similar implements.

The object of the invention is to provide a device of this character which will be simple, strong, durable and comparatively inexpensive in construction and effective in operation.

With the above and other objects in view, the invention consists of the novel features of construction and the combination and arrangement of parts hereinafter fully described and claimed and illustrated in the accompanying drawings, in which—

Figure 1 is a top plan view of the improved harrow attachment showing it applied to a planter; Fig. 2 is a vertical longitudinal section; Fig. 3 is a vertical cross section, the plane of the section being on the line 4—4 in Fig. 1; and Fig. 4 is a detail section through one of the toothed bars or beams showing the manner in which the teeth are mounted therein.

In the drawings 1 denotes a corn, cotton or other seed planter having side bars 2, and 3 denotes the improved harrow attachment adapted to be detachably secured to said side bars. The harrow 3 is V-shaped, being composed of two forwardly converging toothed bars or beams 4 each of which is preferably constructed of wood and has bolted upon its top a metal reinforcing plate or strap 5. The forward converging ends of the toothed bars 4 are cut off at an angle and the corresponding ends of the reinforcing plates 5 are extended to overlap each other and are united by a vertical pivot 6 so that the toothed bars are pivotally connected for swinging movement toward and from each other. By reason of this construction, the harrow may be increased or decreased in width according to the size and construction of the planter to which it is applied; and in order to secure the toothed bars in spaced relation an adjustable connecting bar 7 is provided. Said bar 7 extends across the top of the toothed bars and is adjustably connected thereto by providing in it, adjacent to its ends, longitudinal series of apertures 8, any of which are adapted to receive the screw threaded stems or shanks 9 of harrow teeth 10, as clearly shown in Fig. 4. These harrow teeth are in the form of straight spikes having body portions extending through vertical openings in the bars or beams 4 and their upper ends reduced to provide the stems 9. The latter pass through openings in the reinforcing plates 5 and provide shoulders 11 which engage the bottom faces of the plates 5. Nuts 12 are provided upon the threaded projecting ends of the stems 9 to effectively unite said parts and retain the teeth 10 in the toothed bars. The connecting or cross bar 7 is also used for the attachment of the planter 1, which latter is adapted to have its side bars 2 secured to the under face of the cross bar 7 by means of bolts or other removable fastenings 13. The planter is further secured to the harrow attachment by a pair of connecting straps 14, the forward ends of which are bolted, at 15, to the toothed bars and the rear ends of which are secured by bolts or similar removable fastenings 16 to the side bars 2 of the planter. The connecting straps 14 are arranged beneath the toothed bars and the side bars 2 and in connection with the cross bar 7, effectively unite the harrow attachment to the planter.

17 denotes a draft connection in the form of a spiral hook adapted to receive the whiffletree or similar draft device and having its rear end secured to the harrow by the pivot 6.

Having thus described the invention what is claimed is:

1. A harrow attachment for planters comprising forwardly converging toothed bars, reinforcing plates secured upon the toothed bars and having their forward ends extended beyond said bars and overlapping, a vertical pivot uniting said overlapping ends of the plates, a draft connection upon said pivot, a cross bar between the toothed bars and adjustably connected at its ends to them, means for securing the cross bar to a planter, and connecting straps secured to the toothed bars and adapted to be attached to the planter.

2. A harrow attachment for planters comprising forwardly converging toothed bars,